US012709466B1

(12) United States Patent
McIntyre

(10) Patent No.: US 12,709,466 B1
(45) Date of Patent: Aug. 18, 2026

(54) TRASH CAN RESTRAINING DEVICE

(71) Applicant: Scott McIntyre, Peyton, CO (US)

(72) Inventor: Scott McIntyre, Peyton, CO (US)

( * ) Notice: Subject to any disclaimer, the term of this patent is extended or adjusted under 35 U.S.C. 154(b) by 0 days.

(21) Appl. No.: 18/967,886

(22) Filed: Dec. 4, 2024

(51) Int. Cl.
*B65F 1/14* (2006.01)

(52) U.S. Cl.
CPC .......... *B65F 1/14* (2013.01); *B65F 2210/148* (2013.01)

(58) Field of Classification Search
CPC .... B65F 2210/148; B65F 1/14; B65F 1/1473; B65F 1/1468; B62B 5/049
USPC ...... 248/154, 47.34; 280/79.5; 220/908, 729
See application file for complete search history.

(56) References Cited

U.S. PATENT DOCUMENTS 3,679,161 A * 7/1972 Husting ................. A47G 29/06 211/85.19
4,930,653 A * 6/1990 Machado .............. B65F 1/1426 D34/10
4,995,529 A * 2/1991 Sher ........................ B65F 1/141 220/676
5,074,572 A * 12/1991 Delmerico ............ B65F 1/1468 280/79.5
5,758,888 A * 6/1998 Burgan ..................... B65F 1/14 280/79.5
6,786,349 B2 * 9/2004 Najd ....................... B65F 1/141 220/483
7,494,098 B1 * 2/2009 Fulda ...................... B65F 1/141 248/156
8,505,951 B2 8/2013 Bohse
8,967,421 B2 * 3/2015 Starkey-Johnson ... B65D 25/00 220/570
9,010,562 B1 * 4/2015 Sparks .................. B65F 1/1473 220/475
9,181,027 B2 * 11/2015 Diaz ....................... B65F 1/122
10,125,916 B1 * 11/2018 Rogers ................... B65D 25/20
11,084,653 B1 8/2021 Weber
11,390,127 B1 7/2022 Berg
2004/0164517 A1 8/2004 Lewy et al.
2004/0232184 A1 11/2004 Moen et al.
2009/0283987 A1 11/2009 Long et al.
2013/0327775 A1 * 12/2013 Diaz ....................... B65F 1/122 220/315

(Continued)

FOREIGN PATENT DOCUMENTS

AU 2015100989 A4 8/2015
DE 102021125074 A1 * 3/2023 ............. B62B 5/049
GB 2275035 A 8/1994

*Primary Examiner* — Chun Hoi Cheung
(74) *Attorney, Agent, or Firm* — Cramer Patent & Design, PLLC.; Aaron R. Cramer

(57) ABSTRACT

The present device pertains to a trash can restraining device designed to securely anchor a trash can to a fixed location, preventing inadvertent movement or dislodgement. This is achieved through an innovative bottom tethering system integrated within the trash can. The system includes a tunnel in the bottom surface of the trash can, housing a latching mechanism and a magnet. The latching mechanism engages with a D-ring anchored to the ground, ensuring the trash can remains stationary against external forces. The release mechanism allows for easy disengagement, facilitating normal movement and utility of the trash can. This device presents a practical and efficient solution for maintaining the position and integrity of trash cans in various environments.

1 Claim, 4 Drawing Sheets

(56) References Cited

U.S. PATENT DOCUMENTS

| | | | | |
|---|---|---|---|---|
| 2015/0360862 | A1* | 12/2015 | Siepierski | B62B 5/049 220/523 |
| 2020/0317010 | A1 | 10/2020 | Simmons et al. | |

* cited by examiner

TRASH CAN RESTRAINING DEVICE

RELATED APPLICATIONS

None.

FIELD OF THE DEVICE

The present device falls within the field of waste management equipment, specifically focusing on an innovative solution for stabilizing and securing trash cans. This field has traditionally grappled with issues related to the inadvertent movement or toppling of trash cans due to external factors like strong winds, uneven surfaces, or accidental contact. The device addresses these challenges by introducing a built-in mechanism that effectively anchors the trash can to a specific location, reducing the likelihood of spillage, displacement, and the associated inconvenience and environmental impact. This advancement represents a significant improvement in the design and functionality of trash cans, offering a more reliable and user-friendly solution for both residential and commercial environments where secure waste containment is crucial.

BACKGROUND OF THE DEVICE

Traditional trash cans, while functional for their primary purpose of waste containment, often suffer from a critical shortcoming: they are prone to tipping over or being dislodged from their intended position. This issue is commonly exacerbated by external factors such as high winds, accidental bumps or knocks, uneven surfaces, and even animal interference. The resulting consequences include spilled waste, which not only creates additional clean-up work but also poses environmental hazards and public health concerns. Additionally, displaced trash cans can obstruct thoroughfares, create traffic hazards, and lead to loss or damage of the container itself.

Prior art in this domain has attempted to address these issues through various means. One common approach involves the use of separate anchoring systems, such as weights or external straps, to secure the trash can to the ground. While somewhat effective, these solutions are often cumbersome, aesthetically unpleasing, and may not offer sufficient stability under more extreme conditions. Moreover, they generally require additional components that must be managed and stored separately from the trash can, leading to inconvenience and potential loss or damage of these ancillary parts. Another approach has been the design of trash cans with heavier bases or added materials to lower the center of gravity. However, these designs can make the trash cans more difficult to move and handle, especially when they are full, and do not completely solve the problem of dislodgement due to external forces.

Recognizing these shortcomings in the prior art, the present device introduces a novel integrated system that addresses the need for a more effective and user-friendly method of securing trash cans. This system, built into the structure of the trash can itself, negates the need for external anchoring mechanisms or alterations in the fundamental design of the trash can that compromise its usability. By focusing on an integrated solution, the device offers a seamless, more aesthetically pleasing, and inherently more stable method of preventing trash can dislodgement, thereby enhancing the functionality and reliability of waste containment in various settings. This advancement in trash can design represents a significant step forward in the field of waste management equipment, offering benefits in terms of convenience, environmental protection, public health, and safety.

SUMMARY OF THE DEVICE

Embodiments of the present disclosure may include a trash can restraining device, including a trash can equipped with an integrated bottom tethering system configured for. Embodiments may also include securing the trash can to a ground surface to prevent inadvertent displacement. Embodiments may also include a bottom surface of the trash can, incorporating a centrally routed tunnel. Embodiments may also include a latching mechanism located at a distal end of the tunnel, configured to engage. Embodiments may also include and secure the trash can.

In some embodiments, the latching mechanism may be operatively connected to a release handle. Embodiments may also include an actuating shaft connects the release handle to the latching mechanism. In some embodiments, the release handle may be configured to move along a predetermined path to. Embodiments may also include operate the latching mechanism.

In some embodiments, the trash can restraining device may include a magnet positioned at an end of the tunnel opposite the latching mechanism. In some embodiments, the magnet configured to interact with a D-ring or a similar anchoring element. Embodiments may also include fastened to the ground surface.

In some embodiments, the latching mechanism includes a spring cam latch. In some embodiments, the spring cam latch may be designed to secure an object perpendicular to the bottom. Embodiments may also include surface of the trash can. In some embodiments, the trash can restraining device may include the trash can further equipped with standard features including wheels, a lid. Embodiments may also include handles. In some embodiments, a design of the trash can being adaptable to various types and sizes. In some embodiments, thereby enhancing a utility of the device across different trash can models.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
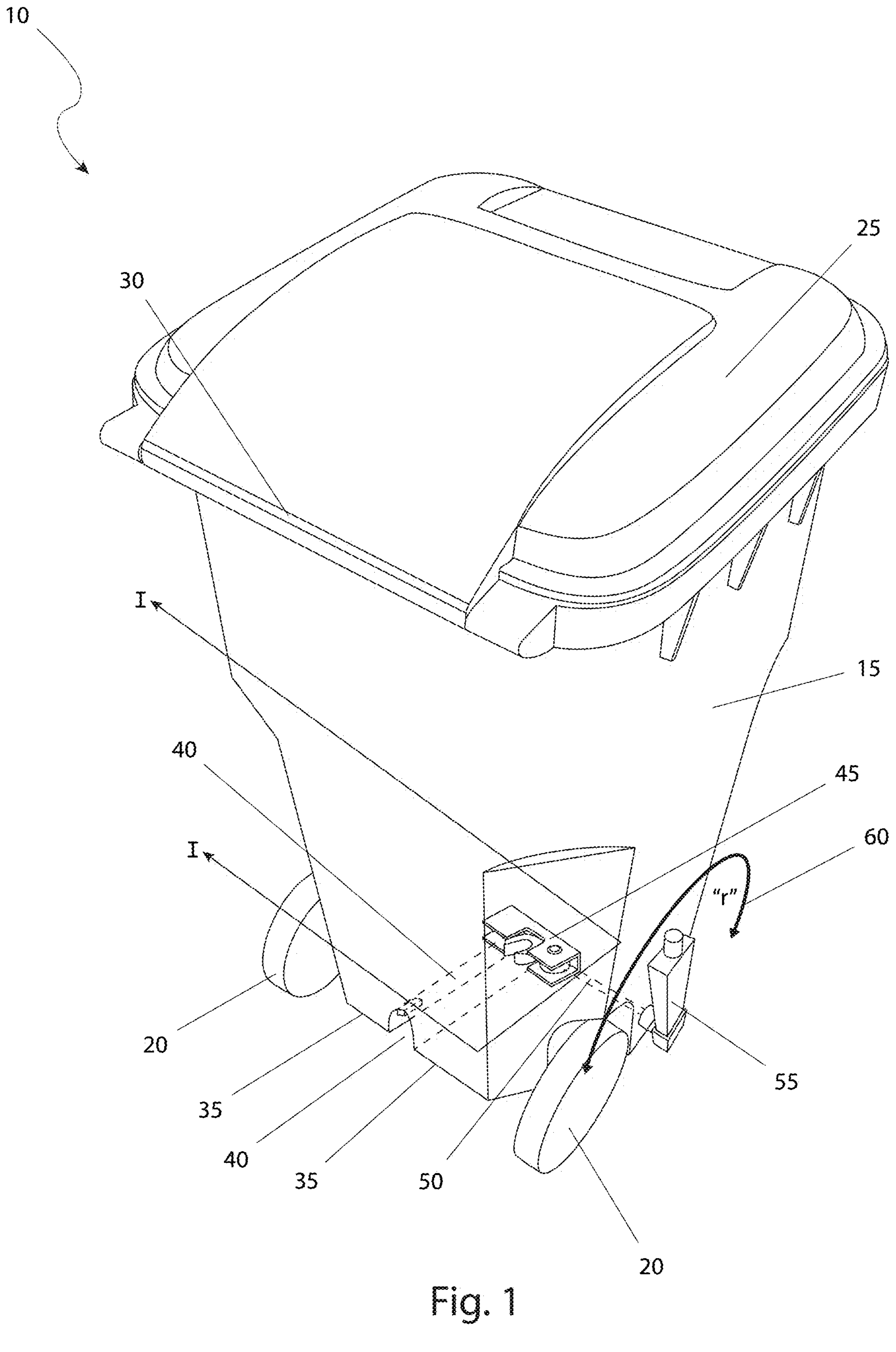
FIG. 1 is a side perspective view of the trash can restraining device 10, according to the preferred embodiment of the present device.

10 trash can restraining device
15 trash can
20 wheel
25 lid 30 handle
35 bottom surface
40 tunnel
45 latching mechanism
50 actuating shaft
55 release handle
60 release handle travel path “r”
65 magnet
70 spring cam latch
75 grade
80 D-ring
85 fastener
90 prone position
95 trash can movement path “a”
100 engaged insert diagram

DESCRIPTION OF THE PREFERRED EMBODIMENTS

The best mode for carrying out the device is presented in terms of its preferred embodiment, herein depicted within FIGS. 1 through 4. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms “a” and “an” herein do not denote a limitation of quantity, but rather denote the presence of at least one (1) of the referenced items.

1. Detailed Description of the Figures

Referring now to FIG. 1, a side perspective view of the trash can restraining device 10, according to the preferred embodiment of the present device is disclosed. The trash can restraining device (herein also described as the “device”) 10, includes a trash can 15 with an integral bottom tethering system that locks the trash can 15 to grade 75 to prevent inadvertent dislodgement. The device 10 is provided as part of (integral component) of a trash can 15. The trash can 15 is depicted as a rolling bin type for purposes of illustration. However, it is noted that other types of trash cans 15 such as different sizes, different materials, with or without wheels, attached or removable lids, or the like can be utilized with the teachings of the present device. As such, the integration of the device 10 upon any specific type or size of trash can 15 is not intended to be a limiting factor of the present device.

The trash can 15 is provided with the typical accompaniments such as wheels 20, lid 25, handles 30, and the like. The bottom surface 35 of the trash can 15 is provided with a tunnel 40 along one (1) center exterior edge which is routed through to the approximate center of the bottom surface 35. The distal end of the tunnel 40 is provided with a latching mechanism 45 such as “bear claw” type of lock commonly found on motor vehicle doors, trucks, hatches, and the like. The exact type of latching mechanism 45 is not intended to be a limiting factor of the present device. An actuating shaft 50 connects the latching mechanism 45 to a release handle 55 located on the exterior of the trash can 15. The release handle 55 is moved along a release handle travel path “r” 60 to operate the latching mechanism 45. Further description on the usage of the release handle 55 with regard to operation of the device 10 will be provided herein below. It is noted that as the majority of the tunnel 40, the latching mechanism 45, and the actuating shaft 50 would not be visible from the exterior of the trash can 15, it is shown via dashed lines to depict their hidden nature.

Figure 2:
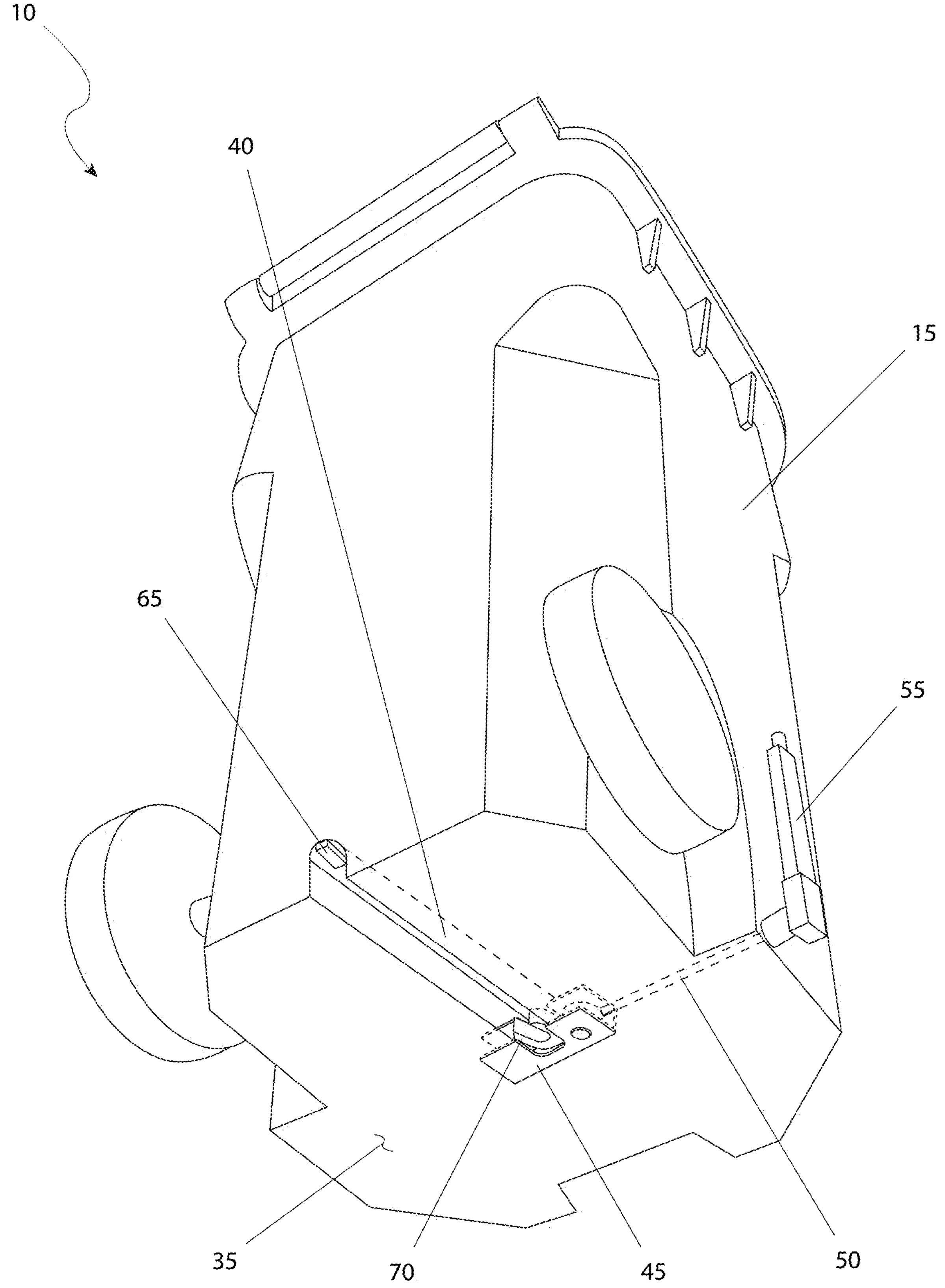
FIG. 2 is a bottom perspective view of the trash can restraining device 10, according to the preferred embodiment of the present device.

Referring next to FIG. 2, a bottom perspective view of the device 10, according to the preferred embodiment of the present device is depicted. This view more clearly depicts the tunnel 40, the latching mechanism 45, and the actuating shaft 50. However, as with FIG. 1, portions of the tunnel 40, and the latching mechanism 45, as well as the actuating shaft 50, remain hidden from view and are thus depicted by dashed lines for purposes of clarity. None of these components extend to the interior of the trash can 15 and are contained on or within the bottom surface 35, thus preserving the sealed interior state as well as ensuring sanitary conditions. The release handle 55 may be released by the user’s foot, hand, or by mechanical means in the case of automated trash can emptying systems. The end of the tunnel 40, opposite of the latching mechanism 45, is provided with a strong magnet 65. Additionally, the latching mechanism 45 is provided with a spring cam latch 70 for the purposes of grabbing a perpendicular object, in relation to the bottom surface 35, and holding it until released by the release handle 55. Further detail on the functionality of the magnet 65 and spring cam latch 70 will be provided herein below.

Figure 3:
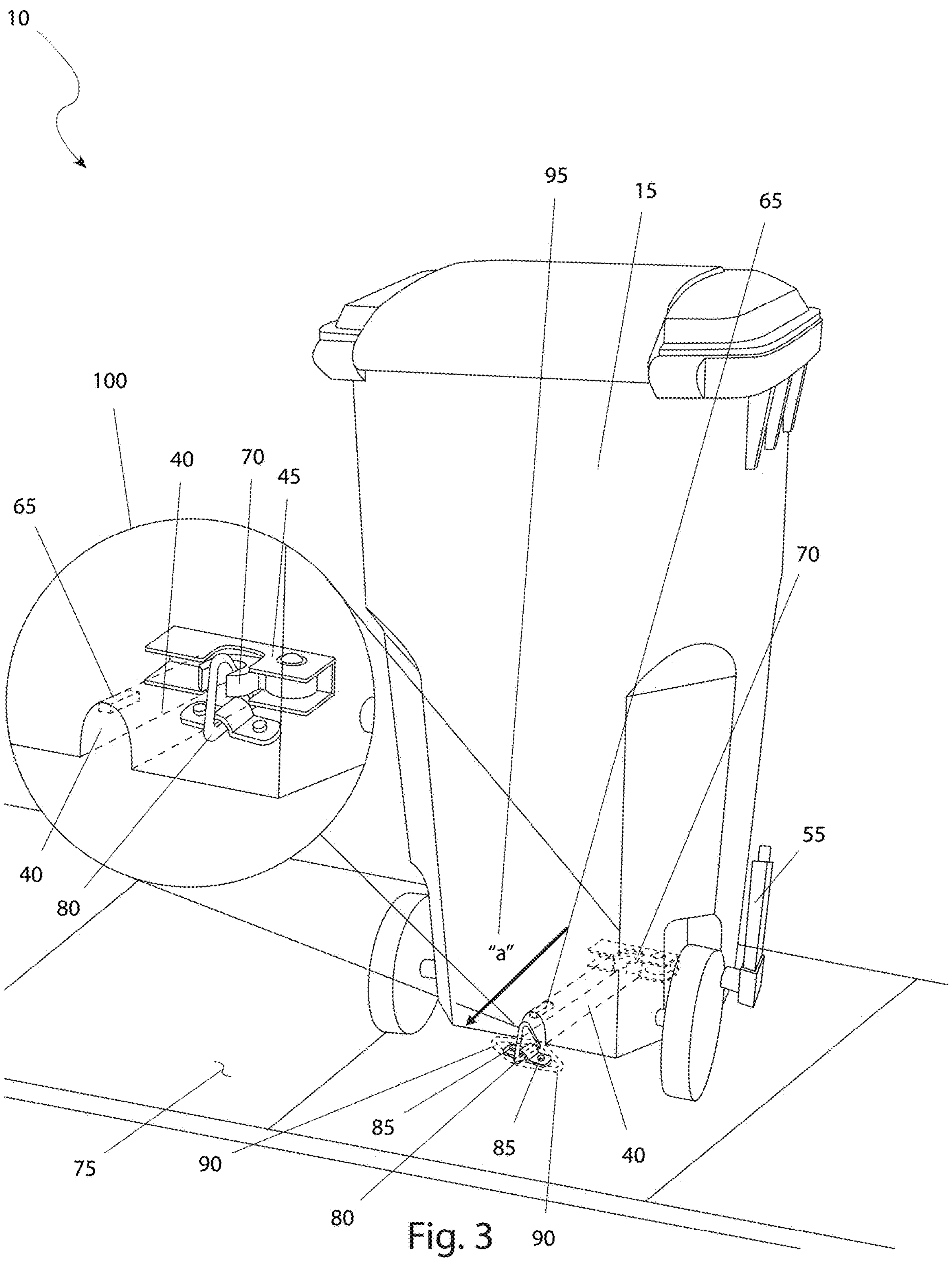
FIG. 3 is a perspective view of the trash can restraining device 10, shown in a utilized state, FIG. 1, according to the preferred embodiment of the present device; and, FIG. 4 is a sectional view of the trash can restraining device 10, as seen along a line I-I, as shown in FIG. 1, according to the preferred embodiment of the present device.

Referring now to FIG. 3, a perspective view of the device 10, shown in a utilized state, FIG. 1, according to the preferred embodiment of the present device is shown. The trash can 15 is depicted in a standard usage location upon grade 75. The usage location is envisioned be an outdoor storage location, a sidewalk, a pad, a tree lawn, a drive apron, or virtually any location where a trash can 15 can be placed for a long or short period of time. The grade 75 is envisioned as a concrete surface, asphalt surface, gravel, wood, turf, or dirt. The exact location of the usage location or type of grade 75 is not intended to be a limiting factor of the present device. A D-ring 80 is fastened to the grade 75 using two (2) appropriate fasteners 85. The fasteners 85 are envisioned to be “Tapcon®” fasteners for concrete, lag bolts for wood, long spikes for turf or dirt, and the like. The use of any specific type of fasteners 85 on any specific type of grade 75 is not intended to be a limiting factor of the present device. In a normal, or non-utilized condition, the D-ring 80 is positioned in a prone position 90 on either side as shown by dashed line. Such a position greatly reduces the tripping hazard of the D-ring 80, should the trash can 15 not be present. As the magnet 65 in the tunnel 40 is moved over the D-ring 80, it assumes an erect position in the center as shown via solid lines. Thus, as the trash can 15 is moved farther along a trash can movement path “a” 95, the D-ring 80 remain upright in the tunnel 40, until it is engaged by the spring cam latch 70 of the latching mechanism 45 as shown in the engaged insert diagram 100. Such engagement provides a stable support for the trash can 15 against dislodgement by wind, physical contact, or other unwanted motion. The latching mechanism 45 may then be released by the release handle 55, thus allowing movement of the trash can 15 in a conventional manner.

Figure 4:
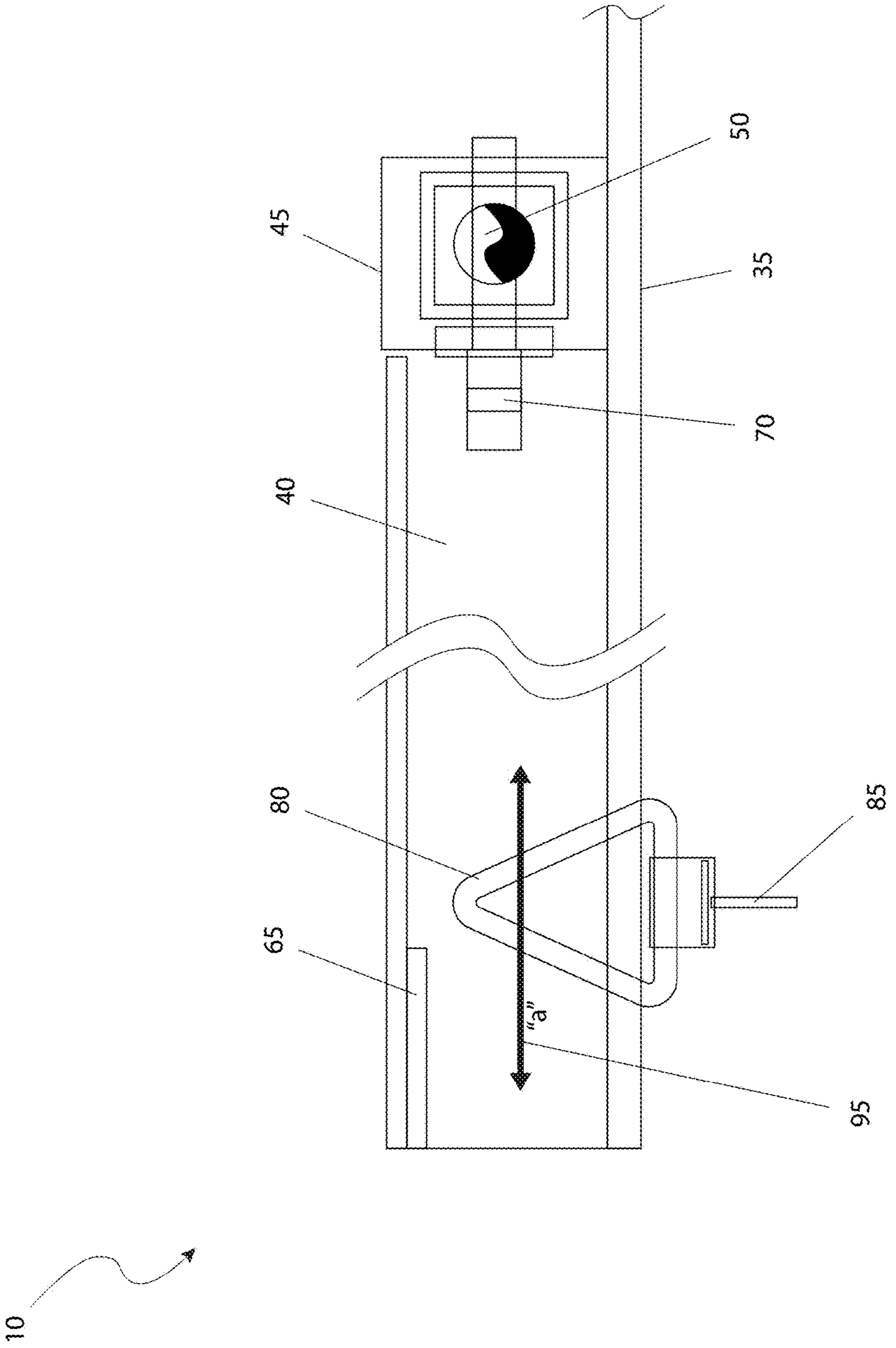

Referring to FIG. 4, a sectional view of the device 10, as seen along a line I-I, as shown in FIG. 1, according to the preferred embodiment of the present device is disclosed. This view provides greater clarity on the configuration of the magnet 65 and the latching mechanism 45 within the tunnel 40, and their relationship to the bottom surface 35 of the trash can 15 (as shown in FIG. 1). The D-ring 80 is fastened into grade 75 (as shown in FIG. 3) using fasteners 85 of the appropriate type and length. As the trash can 15 moves along the trash can movement path "a" 95, the D-ring 80 travels along the tunnel 40. It is lifted into an erect position as shown by the magnet 65, whereupon the tunnel 40 guides the D-ring 80 into the spring cam latch 70 of the latching mechanism 45. The actuating shaft 50 is shown entering the latching mechanism 45 where it allows for disengagement of the D-ring 80 as required.

2. Operation of the Preferred Embodiment

The preferred embodiment of the present device can be utilized by the common user in a simple and effortless manner with little or no training. It is envisioned that the device 10 would be constructed in general accordance with FIG. 1 through FIG. 4. The user would procure the device 10 from conventional procurement channels such as hardware stores, home improvement stores, discount stores, mail order and internet supply houses and the like. Special attention would be paid to the overall type and size of the trash can 15 provided with the device 10.

After procurement and prior to utilization, the D-ring 80 would be fastened to grade 75 at the appropriate location of use, envisioned to be the approximate center point of the bottom surface 35 of the trash can 15. Multiple measurements may need to be utilized, especially in the instance of more than one (1) trash can 15. The locations of use may be one (1) or more locations on a property, depending on usage conditions. For example, a storage location while filling, a storage location while waiting to be emptied (curbside) or the like. The fasteners 85 chosen would depend on the type and material of grade 75. At this point in time, the device 10 is ready for use.

During utilization of the automatic trash can restraining device 10, the following procedure would be initiated: during storage of the trash can 15, it would be initially placed such that the tunnel 40 is adjacent to the D-ring 80, with the D-ring 80 likely in a prone position 90. Next, the trash can 15 is moved, along the trash can movement path "a" 95, such that the D-ring 80 enters the tunnel 40 and is lifted into an erect position by the magnet 65. The trash can 15 is continually moved along the linear trash can movement path "a" 95 with the D-ring 80 held captive inside of the tunnel 40, until the D-ring 80 engages the spring cam latch 70 of the latching mechanism 45. At such point in time, the latching mechanism 45 is actuated by spring pressure, thus holding the D-ring 80 securely. Such action then secures the trash can 15 to the grade 75 and prevents unwanted movement such as from high winds, accidental contact, and the like.

At the point in time in which the trash can 15 is needed to be moved, the user will simply move the release handle 55 along the release handle travel path "r" 60 to disengage the spring cam latch 70 and thus the latching mechanism 45 from the D-ring 80. At this point in time, the trash can 15 may be moved in a conventional manner. Such operation is envisioned to continue on a repeating cyclical manner.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A trash can restraining device, comprising:

a trash can having a bottom surface, at least one wheel, a lid, and at least one handle;

a tunnel formed in and extending along the bottom surface of the trash can, wherein the tunnel is routed from a center exterior edge of the bottom surface toward an approximate center of the bottom surface such that the tunnel does not penetrate an interior of the trash can;

a magnet disposed at an open entry end of the tunnel, the magnet configured to attract and lift, into an erect orientation within the tunnel, a D-ring anchoring element that is fastened to a ground surface by at least one fastener;

a spring cam latch disposed at a distal end of the tunnel opposite the magnet, the spring cam latch being actuated by spring pressure to automatically capture and secure the D-ring when the D-ring travels through the tunnel and reaches the distal end, wherein the spring cam latch secures the D-ring in a perpendicular orientation relative to the bottom surface of the trash can to prevent inadvertent displacement of the trash can from the ground surface; and, an actuating shaft operatively connecting the spring cam latch to a release handle located on an exterior surface of the trash can, wherein the release handle is configured to move along a predetermined travel path to disengage the spring cam latch from the D-ring to allow movement of the trash can.

* * * * *